(12) United States Patent
Kato et al.

(10) Patent No.: US 6,661,843 B2
(45) Date of Patent: Dec. 9, 2003

(54) MOVING PICTURE COMPRESSION/EXPANSION APPARATUS

(75) Inventors: Motoki Kato, Kanagawa (JP); Kazuhisa Hosaka, Saitama (JP); Kazunori Yasuda, Kanagawa (JP); Nobuyoshi Miyahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/140,791

(22) Filed: May 7, 2002

(65) Prior Publication Data

US 2002/0126753 A1 Sep. 12, 2002

Related U.S. Application Data

(63) Continuation of application No. 08/926,164, filed on Sep. 9, 1997, now Pat. No. 6,418,167.

(30) Foreign Application Priority Data

Sep. 10, 1996 (JP) .............................................. 8-239421

(51) Int. Cl.[7] ................................................. H04N 7/32
(52) U.S. Cl. ................................................. 375/240.16
(58) Field of Search .......................... 341/67; 348/699; 375/240.01–240.03, 240.12–240.16, 240.21, 240.22, 240.24; H04N 7/32

(56) References Cited

U.S. PATENT DOCUMENTS

| | | |
|---|---|---|
| 4,307,420 A | 12/1981 | Ninomiya et al. .......... 348/413 |
| 4,745,459 A | 5/1988 | Ninomiya et al. .......... 348/431 |
| 4,882,613 A | 11/1989 | Masumoto .................. 348/630 |
| 4,979,037 A | 12/1990 | Mizutani et al. ............ 348/424 |
| 5,124,812 A | 6/1992 | Sato et al. ..................... 386/98 |
| 5,416,522 A | 5/1995 | Igarashi ...................... 348/416 |
| 5,473,380 A | 12/1995 | Tahara |
| 5,510,840 A | 4/1996 | Yonemitsu et al. ......... 348/402 |
| 5,544,266 A | 8/1996 | Koppelmans et al. .... 348/402.1 |
| 5,566,192 A * | 10/1996 | Moon .......................... 341/67 |
| 5,654,760 A | 8/1997 | Ohtsuki ...................... 386/111 |
| 5,666,461 A | 9/1997 | Igarashi et al. ............. 386/112 |
| 5,699,124 A | 12/1997 | Nuber et al. ............. 348/845.2 |
| 5,715,005 A | 2/1998 | Masaki ....................... 348/416 |
| 5,777,678 A | 7/1998 | Ogata et al. ................ 348/415 |
| 5,805,225 A | 9/1998 | Tahara et al. ............... 348/409 |
| 5,825,928 A | 10/1998 | Yu ............................... 348/699 |
| 5,831,688 A | 11/1998 | Yamada et al. |
| 5,940,130 A | 8/1999 | Nilsson et al. ......... 375/240.12 |

* cited by examiner

Primary Examiner—Richard Lee
(74) Attorney, Agent, or Firm—Frommer Lawrence & Haug LLP; William S. Frommer; Gordon Kessler

(57) ABSTRACT

A moving picture compression apparatus in which signal deterioration can be minimized on repeated compression/expansion. The moving picture compression apparatus compresses a moving picture signal having a motion vector multiplexed in its blanking portion and includes a motion vector separator 13 for separating the motion vector multiplexed in the blanking portion of the moving picture signal and components from a difference calculating unit 2 to a motion compensation unit 10 for compressing the moving picture signal using the motion vector.

4 Claims, 10 Drawing Sheets

MOVING PICTURE COMPRESSION/EXPANSION APPARATUS

This is a continuation of application Ser. No. 08/926,164, filed Sep. 9, 1997, now U.S. Pat. 6,418,167.

BACKGROUND OF THE INVENTION

1. Field of the Invention

This invention relates to a moving picture compression apparatus and a moving picture expansion apparatus suitable for a system for transmitting or storing moving picture signals, such as a digital television broadcasting equipment or a digital video disc.

2. Description of the Related Art

In a system for transmitting or storing digital moving picture signals, picture signals are encoded (compressed) by exploiting intra- or inter-frame correlation of moving picture signals for efficient utilization of a transmission channel or a storage medium. As encoding (compression) techniques for moving picture signals, there is known a compression system standardized by a research organization termed Moving Picture Experts Group (MPEG) for encoding moving pictures for storage.

In the method for compressing picture signals by exploiting the intra-frame correlation, orthogonal transform, such as discrete cosine transform (DCT), capable of concentrating coefficients for encoding, is predominantly employed.

In the method for compressing picture signals by exploiting the inter-frame correlation, so-called motion-compensated inter-frame prediction is predominantly employed. The principle of the motion-compensated inter-frame prediction is now explained by referring to FIG. 1. It is assumed that pictures P1 and P2 have been generated at time pints t1 and t2, respectively, with the picture P1 having been transmitted and with the picture P2 being about to be transmitted, as shown in FIG. 1. The picture P2 is split into plural blocks for each of which the amount of motion (motion vector) between it and the picture P1 is detected. The motion-compensated inter-frame prediction resides in finding a difference picture between a prediction picture and the block of the picture P2 and encoding the difference picture and the motion vector. The prediction picture corresponds to the picture P1 moved in translatory movement a distance equal to the motion vector.

FIGS. 2 and 3 shows a conventional moving picture compression device which takes advantage of the above-described intra- and inter-frame correlation, and the structure of a conventional moving picture expansion device, respectively.

The conventional moving picture compression device, shown in FIG. 2, compresses the input digital picture signal entering a picture input terminal 101 to output the compressed signal at a bitstream output terminal 109.

In the conventional moving picture compression device, shown in FIG. 2, the picture signals entering the picture input terminal 101 is routed to a motion vector detector 112 where the motion vector is calculated. The motion vector information as found by the motion vector detector 112 is sent to a motion compensation unit 110 which then motion compensates a picture stored in a frame memory 111, based on the motion vector, for formulating a prediction picture.

The digital picture signals entering the picture input terminal 101 are also routed to a difference calculation unit 102 which then calculates the difference between the picture signals entering the picture input terminal 101 and the prediction picture formulated by the motion compensation unit 110. The difference signal, thus found by the difference calculation unit 102, is routed to an orthogonal transform unit 103 for orthogonal transform. The signal orthogonal transformed by the orthogonal transform unit 103 is routed to a quantizer 104 where it is quantized for compression. The quantized data is routed to a multiplexer 108 where it is multiplexed with the motion vector information and outputted at a bitstream output terminal 109.

The data quantized by the quantizer 104 is also routed to a dequantizer 105 where it is dequantized and then inverse orthogonal transformed by an inverse orthogonal transform unit 106. This produces the same difference picture as that restored from the output bitstream. The signal of the difference picture and the signal of the prediction picture formulated by the motion compensation unit 110 are summed together by an adder 107 to produce picture signals which are entered to the frame memory 111 for the above-mentioned motion compensation.

On the other hand, the conventional picture expansion device shown in FIG. 3 expands a bitstream entering an input terminal 121 to output the expanded bitstream at a picture output terminal 126.

Referring to FIG. 3, the bitstream entering an bitstream input terminal 121 is sent to a motion vector separator 122 where the motion vector information is separated from the bitstream. This motion vector information is sent to a motion compensation unit 127 which then motion compensates a picture in the frame memory 128 for constructing a prediction picture.

The quantized data taken out of the bitstream by the motion vector separator 122 is routed to a dequantizer 123 for dequantization and thence supplied to an inverse orthogonal transform unit 124 for inverse orthogonal transform to generate a difference picture. The signals of the difference picture and those of the prediction picture produced by the motion compensation unit 127 are summed together by ah adder 125 to produce picture signals which are stored in a frame memory 128 while being outputted at the picture output terminal 126.

The moving picture compression device and moving picture expansion device, as described above, are occasionally connected in series to each other, as shown in FIG. 4. The compression and expansion devices, thus interconnected in tandem, as shown in FIG. 4, are equivalent to a device for repeatedly executing compression and expansion.

Specifically, the picture signals supplied to a picture input terminal 200 in FIG. 4 are compressed by a moving picture compression device 201 and outputted at a bitstream output terminal 202. This bitstream is supplied by for example broadcasting, communication or recording medium to a bitstream input terminal 220 and expanded by a moving picture expansion device 221 so as to be outputted at a picture output terminal 222. The picture signals, outputted at the picture output terminal 222, are entered via for example an edition unit, not shown, to a picture input terminal 240. The moving picture signals supplied to the picture input terminal 240 are compressed by a moving picture compression device 241 so as to be outputted at a bitstream output terminal 242. This bitstream is supplied by for example broadcasting, communication or recording medium to a bitstream input terminal 260 and expanded by a moving picture expansion device 261 so as to be outputted at a picture output terminal 262. The picture signals outputted at the picture output terminal 222 are sent to for example the edition unit for edition.

In the arrangement shown in FIG. 4, the moving picture compression device 201 and the moving picture expansion device 221 execute first compression/expansion, while the moving picture compression device 241 and the moving picture expansion device 261 execute second compression/expansion. The same holds for the third and following compression/expansion operations.

If the picture is repeatedly compressed/expanded by the above-described compression/expansion system, the picture quality is deteriorated each time the operations are repeated.

Thus it is said to be advisable to match the picture coding type at the time of compression for suppressing picture quality deterioration brought about by repeated compression/expansion. That is, picture quality deterioration is thought to be suppressed by using the same encoded picture type, that is the intra-coded picture or I-picture devoid of motion compensation, a forward predictive encoded picture or P-picture obtained on motion compensation from a temporally previous frame or a bidirectional prediction encoded picture or B-picture obtained on motion compensation from a temporally previous frame and a temporally succeeding frame, as that used for the moving picture compression device 201 and the moving picture compression device 241 of FIG. 4, from one frame to another.

It is also contemplated to set in store the motion vector and all parameters, such as quantized parameters for orthogonal transform. Specifically, the motion vector and all parameters, such as quantized parameters for orthogonal transform, in the moving picture compression device 201 in FIG. 4, are laid in store so as to be used in the moving picture compression device 241. If the motion vector and all parameters, such as quantized parameters for orthogonal transform, are laid in store in this manner, it becomes unnecessary to perform motion prediction again or re-quantization at the time of re-compression thus eliminating picture quality deterioration on repeated compression/expansion.

It has however been found experimentally that simply matching the picture coding type at the time of repeated compression/expansion still leads to significant deterioration such that picture quality is deteriorated each time the compression/expansion operations are repeated.

On the other hand, if the information such as the motion vector and all parameters, including quantized parameters for orthogonal transform, are laid in store, it becomes necessary to provide a separate recording medium for storage of the information, thus complicating the device structure. Moreover, the value laid in store are not necessarily optimum values, while the information volume is excessive for storage.

As described above, repeated compression/expansion of the picture by the moving picture compression/expansion method exploiting the conventional motion compensated inter-frame prediction leads to picture quality deterioration for each compression/expansion, while there has not been known a drastic method for overcoming this drawback.

SUMMARY OF THE INVENTION

It is therefore an object of the present invention to provide a moving picture compression device and a moving picture expansion device whereby it becomes possible to suppress picture quality deterioration otherwise produced on repeated compression/expansion.

In one aspect, the present invention provides a moving picture compression device including motion vector separating means for separating a motion vector multiplexed in a blanking portion of a moving picture signal and compression means for compressing the moving picture signal using the motion vector.

In another aspect, the present invention provides a moving picture expansion device including motion vector separating means for separating a motion vector supplied in a state of being appended to the compressed moving picture signal, expansion means for expanding the compressed moving picture signals using the separated motion vector and multiplexing means for multiplexing the separated motion vector in the blanking portion of the expanded moving picture signal.

According to the present invention, the motion vector used in the moving picture expansion device is multiplexed in a blanking portion of the picture signal and the moving picture expansion device uses the motion vector multiplexed in the blanking portion for compressing the picture, for evading the use of an inappropriate motion vector on the occasion of repeated compression/expansion.

More specifically, according to the present invention, the motion vector used in the moving picture expansion device is multiplexed in the blanking portion of the picture signals and outputted, while the moving picture compression device effects picture compression using the motion vector multiplexed in the blanking portion, so that there is no risk of an inappropriate motion vector being used for repeated compression/expansion, thus minimizing the signal deterioration otherwise caused by repeated compression/expansion.

DESCRIPTION OF THE PREFERRED EMBODIMENTS

Figure 1:
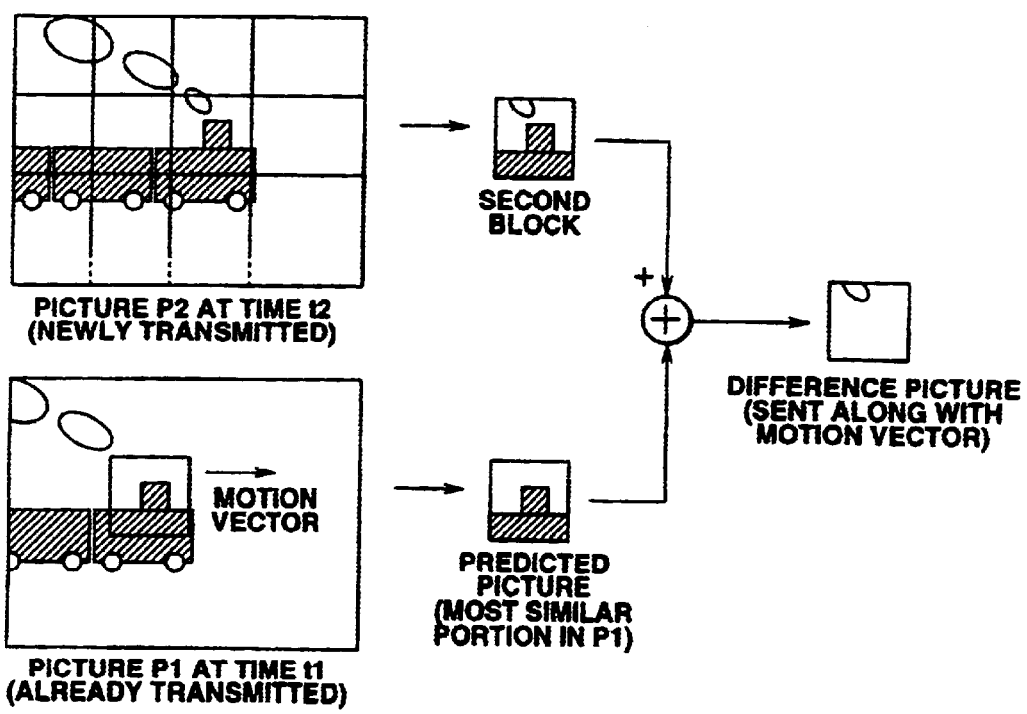
FIG. 1 illustrates the principle of motion-compensated inter-frame prediction.
Figure 2:
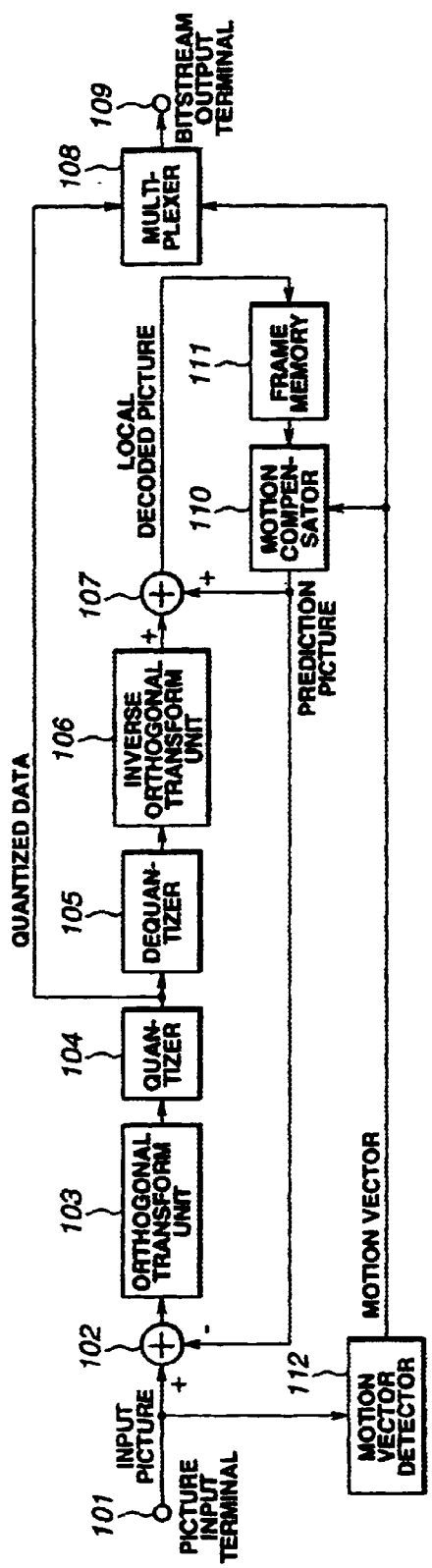
FIG. 2 is a schematic block circuit diagram showing the structure of a conventional moving picture compression device.
Figure 3:
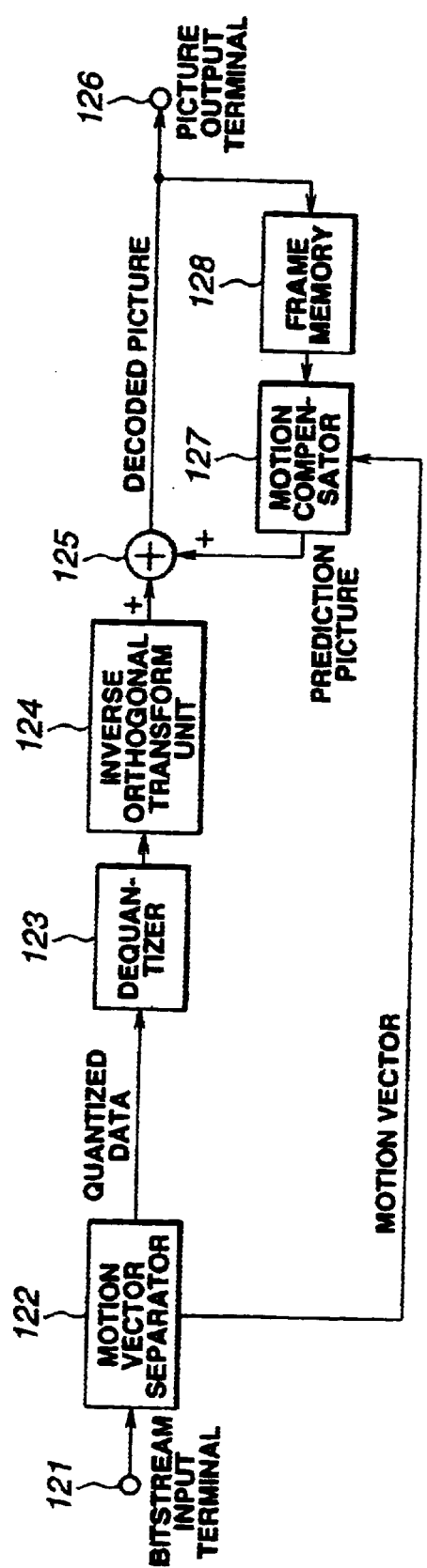
FIG. 3 is a schematic block circuit diagram showing the structure of a conventional moving picture expansion device.

Referring to the drawings, preferred embodiments of the present invention will be explained in detail.

Figure 5:
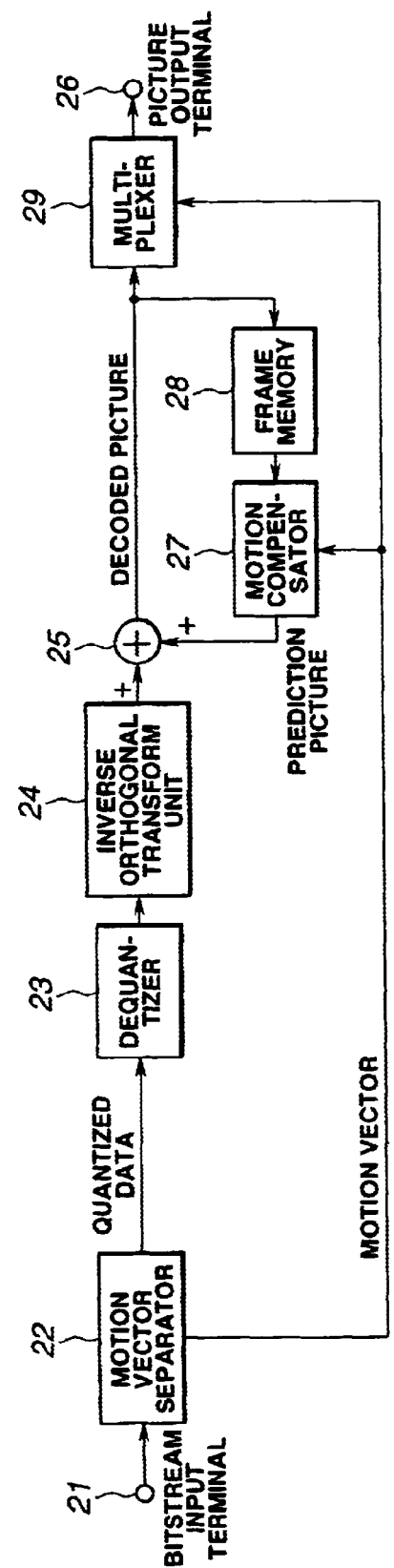
FIG. 5 is a schematic block circuit diagram showing the structure of a moving picture expansion device according to a first embodiment of the present invention.
Figure 7:
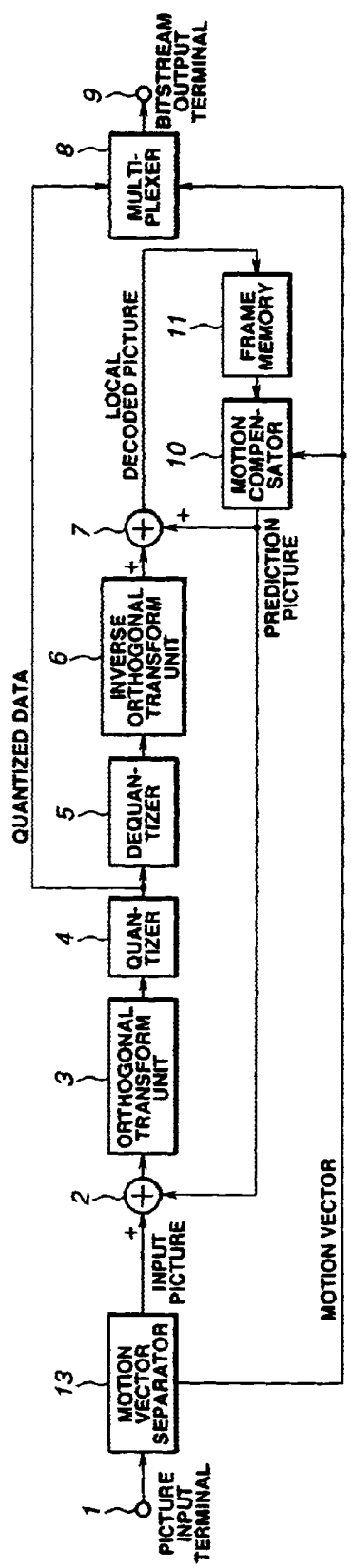
FIG. 7 is a schematic block circuit diagram showing the structure of a moving picture expansion device according to a first embodiment of the present invention.

Referring to FIG. 5, a moving picture expansion device of the present embodiment includes a multiplexer 29 for multiplexing the motion vector in a blanking portion of picture signals for storage. Referring to FIG. 7 the moving picture compression device of the present embodiment includes a motion vector separator 13 for separating the motion vector multiplexed in the blanking portion of the picture signals by the moving picture expansion device of FIG. 5.

That is, in the first embodiment of the present invention, the motion vector information as found by the preceding picture compression and supplied to the expansion device is multiplexed in the blanking portion of the expanded picture and outputted so that, at the time of the subsequent picture compression, the motion vector multiplexed in the blanking portion is separated and used. Thus, in the present first embodiment, there is eliminated the necessity of performing a complex operation of setting the motion vector in store and providing a separate recording medium for setting the motion vector in store.

Referring to FIG. 5, a moving picture expansion device according to the first embodiment of the present invention is explained.

The moving picture expansion device of the first embodiment of the present invention inputs a bitstream at an input terminal 21 and outputs at a picture output terminal 26 a moving picture signal in the blanking portion of which the motion vector is multiplexed.

Referring to FIG. 5, the bitstream entered at the bitstream input terminal 21 is of the format for compression encoding for moving pictures, such as MPEG standard, and contains the motion vector detected at the time of compression encoding of the moving pictures in addition to the compressed moving picture signals. This bitstream is sent to a motion vector separator 22 where the motion vector information is separated from the bitstream. This motion vector information is sent to a motion compensation unit 27. The motion compensation unit 27 motion compensates the picture in the frame memory 28 based on the motion vector for constructing a prediction picture.

The quantized data (compressed moving picture signals) taken out from the bitstream by the motion vector separator 22 is sent to a dequantizer 23 for dequantization and thence supplied to an inverse orthogonal transform unit 24 for inverse orthogonal transform to generate a difference picture. The signals of the difference picture produced by the motion compensation unit 27 are summed together by an adder 25 to produce picture signals which are stored in a frame memory 28 while being sent to the multiplexer 29.

In the moving picture expansion device of the present first embodiment of the present invention, the multiplexer 29 multiplexes the motion vector information outputted by the motion vector separator 22 in the blanking portion of a picture outputted by the adder 25. The signals having the motion vector information multiplexed in a blanking period of the picture by the multiplexer 29 are outputted from the picture output terminal 26.

An illustrative method for multiplexing the motion vector information in the blanking portion of the picture is now explained.

Figure 6:
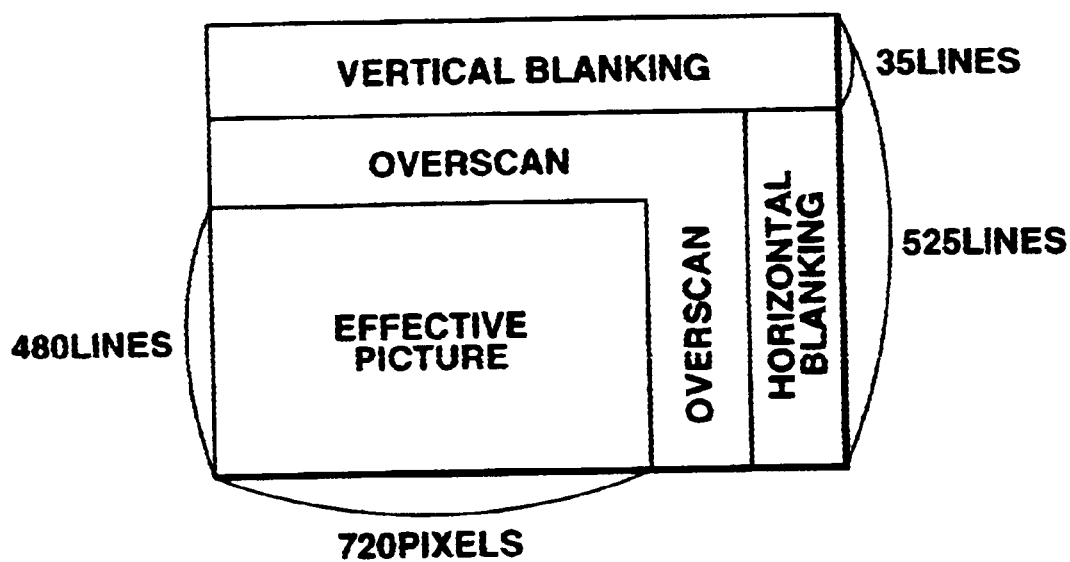
FIG. 6 illustrates a blanking in which to multiplex the motion vector information.

Since the blanking portion of the picture signals corresponds to the blanking period, it is a picture portion not displayed as a picture. The blanking is classified into horizontal blanking corresponding to the horizontal blanking period and vertical blanking corresponding to the vertical blanking period. In the NTSC television broadcasting system employed in Japan and United States of America, 35 lines per frame represent vertical blanking, as shown in FIG. 6.

If the picture of the NTSC television broadcasting system is handled with the MPEG2 standard, the encoded pixels are usually 720 pixels by 480 lines, with the motion compensation unit block being 16 pixels by 16 lines, termed a macro-block. The number of macro-blocks per frame is (720/16) (480/16)=1350 pixels. The maximum number of the motion vector per macro-block is four. For representing a motion vector, 16 bits in fixed-length representation suffice even if the maximum of ±96 pixels are taken vertically and horizontally. Therefore, 1350 4 16=86400 bits are sufficient as a required number of bits for representing the motion vector in one frame.

Also, if 720 pixels in terms of 8 bits are used per line of the vertical blanking of a picture, 8 720=5760 bits/line can be used.

It is seen from above that, if 86400/5760=15 lines of vertical blanking are used per frame, the motion vector can be multiplexed to picture signals in fixed length representation. Since there are 35 lines of vertical blanking per frame, this multiplexing is feasible.

Referring to FIG. 7, a moving picture compression device according to the first embodiment of the present invention is explained.

In the moving picture compressing device of the present invention, picture signals entering a picture input terminal 1 are compressed, and the compressed picture signals are outputted at a bitstream output terminal 9.

Referring to FIG. 7, picture signals obtained on multiplexing the motion vector information in the blanking portion by the picture expansion device of FIG. 5 are supplied to the picture input terminal 1. The picture signals, comprised of the motion vector information multiplexed in the blanking portion, entering the picture input terminal 1, are sent to a motion vector separator 13, which then separates, from the picture signals supplied from the input terminal 1, the motion vector multiplexed in the blanking portion, and sends the motion vector information to a motion compensation unit 10 and to a multiplexer 8, while sending the picture signals freed of the motion vector to a difference calculating unit 2.

The motion compensation unit 10, supplied with the motion vector information from the motion vector separator 13, motion compensates the picture stored in the frame memory 11 based on the motion vector for formulating a prediction picture.

The difference calculating unit 2, fed with the picture signals from the motion vector separator 13, calculates the difference between the picture signals and the prediction picture formulated by the motion compensation unit 10. The difference signal as found by the difference calculating unit 2 is sent to an orthogonal transform unit 3 for orthogonal transform processing. The signal orthogonal transformed by the orthogonal transform unit 3 is sent to a quantizer 4 for quantization for compression. The quantized data is sent to the multiplexer 8 for multiplexing with the motion vector information supplied from the motion vector separator 13. The resulting multiplexed signal is outputted at a bitstream output terminal 9. The multiplexing occurs in accordance with for example the MPEG format.

The quantized data from the quantizer 4 is also sent to a dequantizer 5 for dequantization and thence supplied to an inverse orthogonal transform unit 6 for inverse orthogonal transform. This produces a difference picture which is the same as that restored from the output bitstream. The signal of the difference picture and the signal of the prediction picture formulated by the motion compensation unit 10 are summed together by the adder 7 to produce picture signals which are then stored in the frame memory 11.

In the moving picture compression device of the above-described first embodiment of the present invention, the picture signals with the motion vector multiplexed thereon are entered to the picture input terminal 1, and the motion vector and the picture signals are separated from the picture signals multiplexed with the motion vector in the motion vector separator 13, with the motion vector being sent to the motion compensation unit 10 and to the multiplexer 8.

Figure 4:
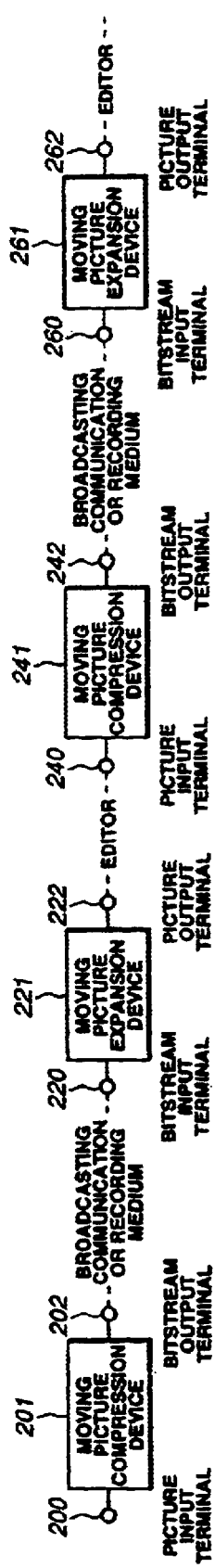
FIG. 4 shows the state of connection of the moving picture compression device and the picture expansion device.

With the above-described first embodiment of the moving picture compression device and moving picture expansion device, since the motion vector multiplexed in the blanking can be used at the time of repeated compression and expansion as shown for example in FIG. 4, improper motion vector can hardly be produced in distinction from the conventional practice in which the motion vector is found in a picture already compressed and expanded and hence deteriorated in picture quality. The result is the reduced residuals on motion compensation thus assuring efficient prediction. Moreover, the adequate motion vector as in the present embodiment has high correlation and can be represented with a smaller number of bits thus improving the picture quality even with the same bit rate as the conventional bit rate.

Also, with the first embodiment of the present invention, in which the motion vector information is written in the blanking portion f the picture signals not used for picture display, there is no necessity of recording the motion vector in a separate recording medium as is required in the conventional practice.

The second embodiment of the present invention is explained. In the moving picture compression device of the present second embodiment, parts or components similar in structure to the first embodiment are depicted by the same reference numerals. The moving picture expansion device as a counterpart device of the moving picture compression device of the second embodiment is the same as that of the first embodiment and hence the corresponding description is omitted for simplicity.

Figure 8:
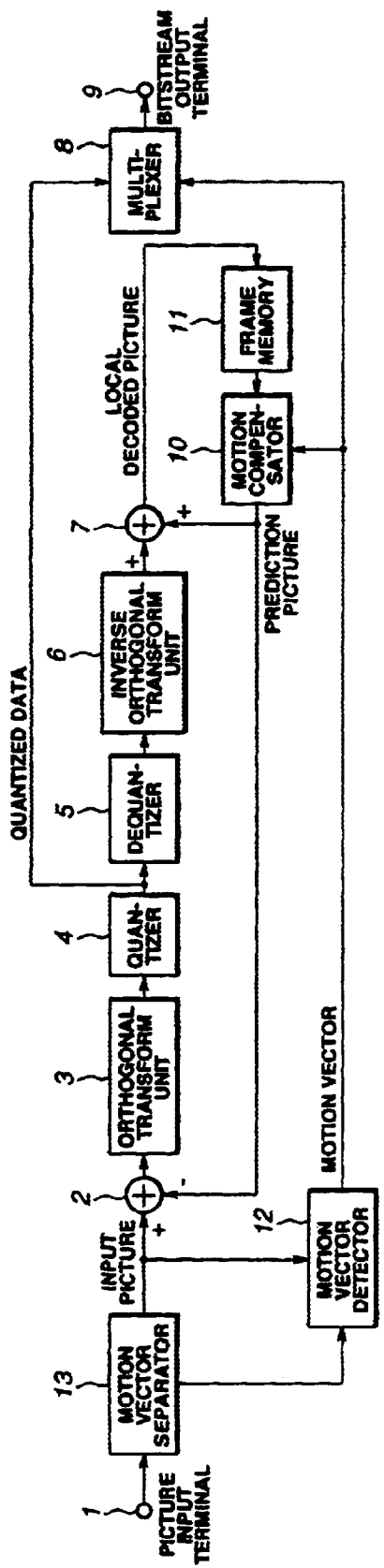
FIG. 8 is a schematic block circuit diagram showing the structure of a moving picture expansion device according to a second embodiment of the present invention.

In the second embodiment of the present invention, the moving picture compression device retrieves a more appropriate motion vector for overcoming the drawback that the motion vector laid in store by being multiplexed in the blanking portion of the picture signals as described above is not necessarily an optimum motion vector. Specifically, with the present second embodiment of the present invention, the moving picture compression device includes a motion vector detector 12, as shown in FIG. 8. This motion vector detector 12 retrieves again a more appropriate motion vector from the input picture based on the motion vector separated from the motion vector separator 13.

In the moving picture compression device of the second embodiment of the present invention, shown in FIG. 8, picture signals having the motion vector information multiplexed in the blanking portion thereof by the moving picture expansion device of FIG. 1 are sent to the picture input terminal 1. The input signal at the picture input terminal 1 is sent to the motion vector separator 13 where the motion vector is separated. The resulting motion vector information is supplied to the motion vector detector 12 while the picture signals freed of the motion vector are sent to the motion vector detector 12 and to the difference calculating unit 2.

The motion vector detector 12 retrieves again the neighborhood of the motion vector separated by the motion vector separator 13 on the input picture and outputs the new motion vector as obtained as the result of second retrieval to the motion compensation unit 10 and to the multiplexer 8. The range of the second retrieval need not be set as large as the entire range of the values assumed by the motion vector, that is the entire range of the input picture, but only may be the neighborhood of the motion vector separated by the motion vector separator 13. In this manner, there is no risk of increasing the motion vector exhibiting lesser correlation at a position far from a position indicated by the motion vector separated by the motion vector separator 13 thus enabling the motion vector with lesser residuals to be produced.

The motion compensation unit 10 motion compensates the picture stored in the frame memory 11 based on the motion vector supplied thereto to produce a prediction picture.

The difference calculating unit 2 calculates the difference between the picture signals supplied thereto and the prediction picture produced by the motion compensation unit 10 to transmit the resulting difference signal to the orthogonal transform unit 3. The signal orthogonal transformed by the orthogonal transform unit 3 is sent to the quantizer 4 for quantization for signal compression.

The quantized data from the quantizer 4 is dequantized by the dequantizer 5 and inverse orthogonal transformed by the inverse orthogonal transform unit 6 for restoring the difference picture signal which is then summed by the adder 7 to the signal of the prediction picture formulated by the motion compensation unit 10. The resulting picture signals are stored in the frame memory 11 for the above-mentioned motion compensation.

The multiplexer 8 multiplexes the motion vector information supplied from the motion vector detector 12 to the quantized data from the quantizer 4. The resulting bitstream is outputted at the bitstream output terminal 9 of the moving picture compression device.

The third embodiment of the present invention is explained. In the present third embodiment, the information volume of the motion vector laid in store in the blanking period can be reduced.

Figure 9:
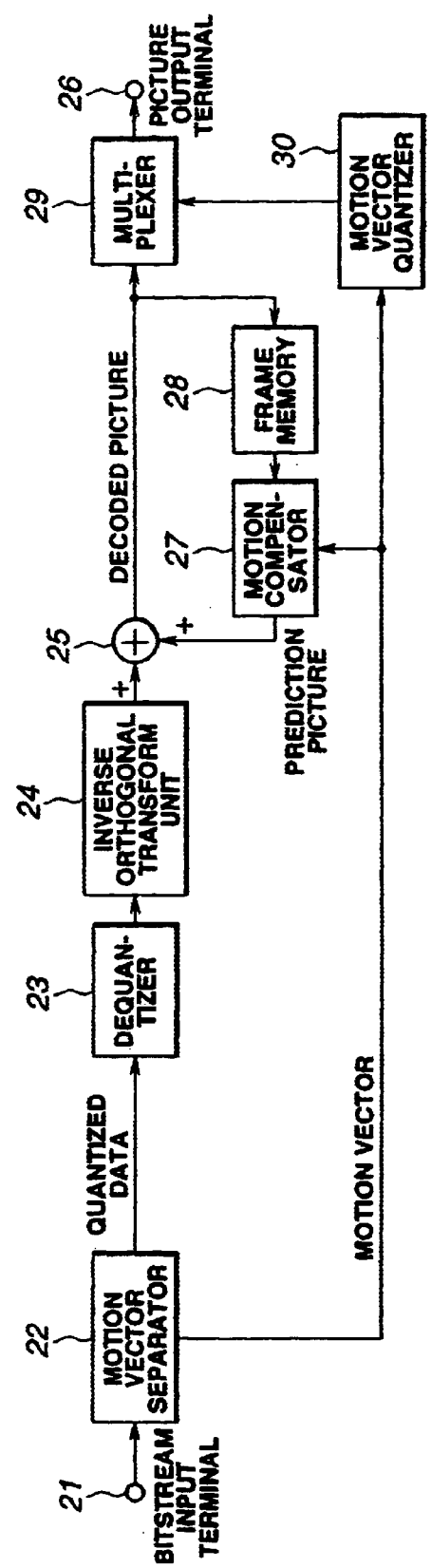
FIG. 9 is a schematic block circuit diagram showing the structure of a moving picture expansion device according to a third embodiment of the present invention.

FIG. 9 shows a moving picture expansion device of the present third embodiment. In FIG. 9, parts or components which are the same as those of FIG. 5 are denoted by the same reference numerals.

In FIG. 9, the bitstream entering the bitstream input terminal 1 contains the motion vector detected at the time of encoding the moving picture as in FIG. 5.

The motion vector separator 22 separates the motion vector information from the bitstream and sends the separated motion vector information to a motion compensation unit 27 and to a motion vector quantizer 30 while sending the remaining quantized data to a dequantizer 23.

The motion vector quantizer 30 quantizesi the motion vector information supplied from the motion vector separator 22 for compression. The motion vector information quantized by the motion vector quantizer 30 is sent to a multiplexer 29.

The motion compensation unit 27 motion compensates the picture in a frame memory 28 based on the motion vector from the motion vector separator 22 for constructing a prediction picture.

The dequantizer 23 dequantizes the quantized data. An output of the dequantizer 23 is inverse orthogonal transformed by an inverse orthogonal transform unit 24 to produce a signal of the difference picture which is summed by an adder 25 to the signal of the prediction picture produced by the motion compensation unit 27. The picture signals obtained by the adder 25 are stored in the frame memory 28 while being sent to the multiplexer 29.

The multiplexer 29 multiplexes the motion vector information quantized by the motion vector quantizer 30 in the blanking portion of the picture signals supplied from the adder 25. An output picture signal of the multiplexer 29 is issued at the picture output terminal 26 of the picture expansion device.

Figure 10:
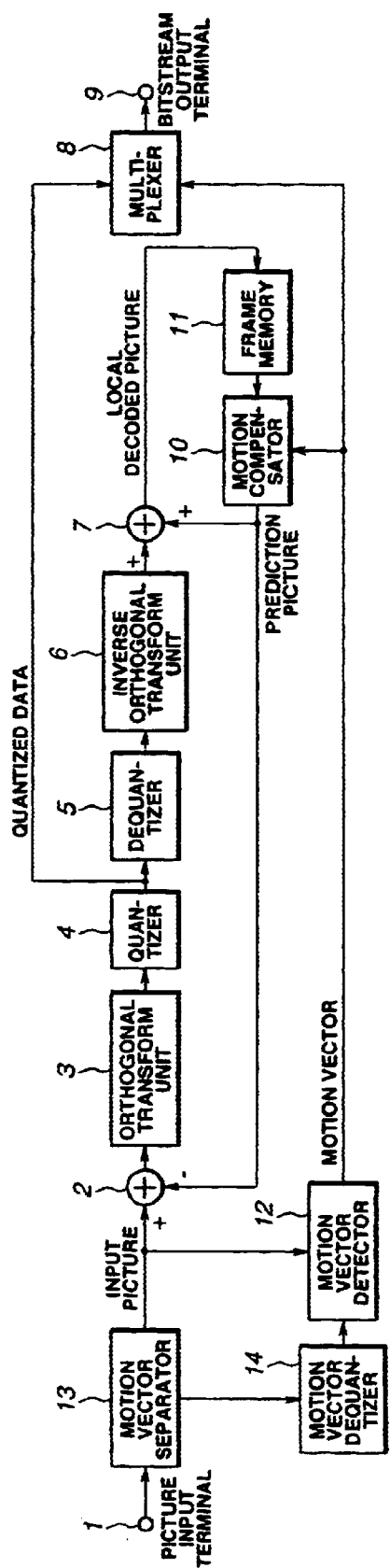
FIG. 10 is a schematic block circuit diagram showing the structure of a moving picture compression device according to the third embodiment of the present invention.

Referring to FIG. 10, a moving picture compression device according to a third embodiment of the present invention, associated with the moving picture expansion device of FIG. 9, is explained. In FIG. 10, parts or components similar in structure to those of the moving picture compression device shown in FIG. 8 are depicted by the same reference numerals.

In FIG. 10, the picture signal obtained on multiplexing the quantized motion vector information by the moving picture expansion device of FIG. 9 in its blanking portion is entered to the picture input terminal 1. The signal entering the picture input terminal 1 is sent to the motion vector separator 13 where the quantized motion vector is separated. The quantized motion vector information is sent to the motion vector dequantizer 14, while the picture signals, freed of the quantized motion vector, are sent to the motion vector detector 12 and to the difference calculation unit 2.

The motion vector dequantizer 14 dequantizes the quantized motion vector information to regenerate the motion vector prior to quantization by the motion vector quantizer 30 of FIG. 9. The motion vector information, obtained by the motion vector quantizer 14, is sent to the motion vector detector 12.

On reception of the motion vector as found by the motion vector dequantizer 14, the motion vector detector 12 retrieves the neighborhood of the motion vector on the input picture, as in the moving picture compression device of the second embodiment, and outputs a new motion vector obtained by the second retrieval to the motion compensation unit 10 and to the multiplexer 8.

The motion compensation unit 10 motion compensates the picture stored in the frame memory 11, based on the motion vector supplied thereto, in order to formulate a prediction picture.

The difference calculation unit 2 calculates the difference between the supplied picture signals and the prediction picture formulated by the motion compensation unit 10, and routes the difference signal to the orthogonal transform unit 3. The orthogonal transformed signal from the orthogonal transform unit 3 is sent to the quantizer 4 where it is quantized for signal compression.

The quantized data from the quantizer 4 is dequantized by the dequantizer 5 and inverse orthogonal transformed by the inverse orthogonal transform unit 6 to restore the difference picture signal which is summed by the adder 7 to the signal of the prediction picture produced by the motion compensation unit 10. The picture signals obtained by the adder 7 are stored in the frame memory 11 for the above-mentioned motion compensation.

The multiplexer 8 multiplexes the motion vector information supplied from the motion vector detector 12 to the quantized data from the quantizer 4. The bitstream, thus produced, is outputted at the bitstream output terminal 9 of the moving picture compression device.

In the present third embodiment, the motion vector information obtained by the motion vector dequantizer 14 may be directly sent to the motion compensation unit 10 and to the multiplexer 8 without providing the motion vector detector 12.

However, if the motion vector is retrieved again as described above, it becomes possible to obtain the motion vector with smaller residuals, as discussed in connection with the second embodiment, such that there results no inconvenience if the motion vector precision is lowered by quantizing the motion vector by the moving picture compression device, but the merit of the present embodiment in reducing the code volume for motion vector can be manifested more effectively. In this manner, the major portion of the banking portion of the picture signals can be used for objects other than laying the motion vector in store, thus enabling compression and expansion with higher picture quality.

In the above-described second and third embodiments, the motion vector or the quantized motion vector may be laid in store not only in the blanking portion of the picture signals, as in the first embodiment, but may be recorded on various recording mediums, such as tape-shaped or disc-shaped recording medium or on a memory. If, for example, a digital video cassette (DVD) is used, the motion vector or the quantized motion vector may be laid in store in a memory enclosed in the cassette, whereas, if a non-linear editing unit is used, the information may be laid in store in a hard disc. In this case, since the recording mediums as described above are required for laying the motion vector or the quantized motion vector in store, it is desirable to lay the information in store in the blanking in the second and third embodiments as in the first embodiment as described above.

In the description of the previous embodiments, the motion vector is directly encoded with a fixed length. However, variable length coding may also be used for further decreasing the data volume multiplexed in the blanking portion.

Moreover, in the above-described embodiments, the motion vector is multiplexed in the blanking of the picture signals. It is however possible to multiplex not only the motion vector but also the picture coding type information in the MPEG standard, the information on the field/frame construction types, information on the demarcation of the group-of-pictures (GOPs) or the scene-change information. If the above information is multiplexed, it becomes possible to produce a picture of higher sound quality at the time of repeated compression/expansion.

In the above-described embodiments of the present invention, the motion vector used in the picture expansion device is multiplexed in the blanking portion of picture signals, while the moving picture compression device effects picture compression using the motion vector multiplexed in the blanking portion, so that there is no risk of using an inappropriate motion vector even on the occasion of repeated compression/expansion, thus realizing efficient encoding with little residuals on motion compensation. The adequate motion vector has high correlation so that the code volume for representation of the motion vector can be diminished thus improving the picture quality for the same bit rate. Moreover, in the second embodiment, it becomes possible to retrieve magneto-resistance effect appropriate motion vector and to use the resulting appropriate motion vector. In the third embodiment, the information volume for the motion vector can be quantized for reducing its volume. These merits can be realized without using separate data storage means.

What is claimed is:

1. A moving picture compression device comprising:

motion vector separating means for receiving an expanded motion picture signal that had been produced by multiplexing an expanded moving picture signal with a motion vector that was used for the expansion of said moving picture signal, and for separating a received motion vector from the received expanded motion picture signal; and compression means for compressing the received expanded motion picture signal using the separated motion vector.

2. A moving picture compression device comprising:

motion vector separating means for receiving an expanded motion picture signal that had been produced by multiplexing an expanded moving picture signal with a motion vector that was used for the expansion of said moving picture signal, and for separating a received motion vector from the received expanded motion picture signal;

motion vector detection means responsive to the separated motion vector for detecting, from the received expanded motion picture signal freed of the multiplexed motion vector, a new motion vector in the neighborhood of the separated motion vector; and compression means for compressing the received expanded motion picture signal using the new motion vector.

3. A moving picture compression device comprising:

motion vector separating means for separating from a received moving picture signal a motion vector multiplexed in a blanking portion in the received moving picture signal;

wherein said motion vector is separated from said blanking portion before compression and expansion, and is used for compression and expansion when repeated compression and expansion of said received moving picture signal is to occur;

motion vector detection means responsive to the separated motion vector for detecting, from the received moving picture signal freed of the multiplexed motion vector, a new motion vector in the neighborhood of the separated motion vector; and compression means for compressing the received moving picture signal using the new motion vector.

4. A moving picture expansion device for expanding a compressed motion picture signal comprising:

motion vector separating means for separating from the compressed motion picture signal a motion vector appended thereto;

expansion means for expanding the compressed motion picture signal using the separated motion vector; and multiplexing means for multiplexing the separated motion vector in a blanking portion in a received moving picture signal with the expanded motion picture signal; wherein said motion vector is separated from said blanking portion before compression and expansion, and is used for compression and expansion when repeated compression and expansion of said received moving picture signal is to occur.

* * * * *